United States Patent
Canelones et al.

(10) Patent No.: US 6,700,589 B1
(45) Date of Patent: Mar. 2, 2004

(54) METHOD, SYSTEM, AND PROGRAM FOR MAGNIFYING CONTENT DOWNLOADED FROM A SERVER OVER A NETWORK

(75) Inventors: Dawn Marie Canelones, Cedar Park, TX (US); Scott Harvey Demsky, Austin, TX (US); Rabindranath Dutta, Austin, TX (US); Kelvin R. Lawrence, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,236

(22) Filed: Feb. 17, 2000

(51) Int. Cl.$^7$ .............................. G09G 5/00; G06F 17/30
(52) U.S. Cl. ........................................ 345/660; 707/10
(58) Field of Search ................................ 345/660, 661, 345/2.1; 707/10, 104.1; 358/1.18

(56) References Cited

U.S. PATENT DOCUMENTS

| | | | | |
|---|---|---|---|---|
| 4,800,379 A | * | 1/1989 | Yeomans ..................... 345/661 |
| 4,985,927 A | | 1/1991 | Norwood et al. ........... 382/149 |
| 5,404,411 A | | 4/1995 | Banton et al. .............. 382/254 |
| 5,715,515 A | | 2/1998 | Akins, III et al. .......... 725/142 |
| 5,805,153 A | | 9/1998 | Nielsen ......................... 725/37 |
| 5,860,074 A | | 1/1999 | Rowe et al. ................. 707/526 |
| RE36,145 E | * | 3/1999 | DeAguiar et al. ........... 345/511 |
| 5,880,856 A | * | 3/1999 | Ferriere ...................... 358/426 |
| 5,959,609 A | | 9/1999 | Gordon ....................... 345/467 |
| 5,974,431 A | * | 10/1999 | Iida ............................. 345/629 |
| 6,006,231 A | | 12/1999 | Popa ........................... 707/10 |
| 6,067,553 A | * | 5/2000 | Downs et al. .............. 358/1.18 |
| 6,128,021 A | * | 10/2000 | van der Meulen et al. . 345/428 |
| 6,157,935 A | * | 12/2000 | Tran et al. ................... 382/187 |
| 6,202,060 B1 | * | 3/2001 | Tran ........................... 707/104.1 |
| 6,281,874 B1 | * | 8/2001 | Sivan et al. .................. 345/2.1 |
| 6,396,507 B1 | * | 5/2002 | Kaizuka et al. ............. 345/661 |
| 6,396,941 B1 | * | 5/2002 | Bacus et al. ................. 382/128 |
| 6,453,073 B2 | * | 9/2002 | Johnson ...................... 382/239 |
| 6,496,189 B1 | * | 12/2002 | Yaron et al. ................ 345/428 |

FOREIGN PATENT DOCUMENTS

| | | |
|---|---|---|
| GB | 2330222 | 4/1999 |
| JP | 11110455 | 4/1999 |
| JP | 11175709 | 7/1999 |

* cited by examiner

*Primary Examiner*—Michael Razavi
*Assistant Examiner*—Ryan Yang
(74) *Attorney, Agent, or Firm*—David W. Victor; Konrad Raynes Victor & Mann

(57) ABSTRACT

Disclosed is a system, method, and program for magnifying displayed content downloaded from a server over a network. Information is received indicating selection of a region of the displayed content to magnify. A determination is made of at least one region of the selected region including image content. The server maintains a high resolution file version and a low resolution file version of the image content. A determination is then made as to whether the selected image content from the displayed image file is the low resolution file version. If so, a command is generated to retrieve from the server specific byte locations from the high resolution file version including the image content in the selected region. The specified bytes are less than all the image data bytes in the high resolution version of the file if the image content in the selected region comprises less than all of the image content maintained in the high resolution version of the file.

30 Claims, 3 Drawing Sheets

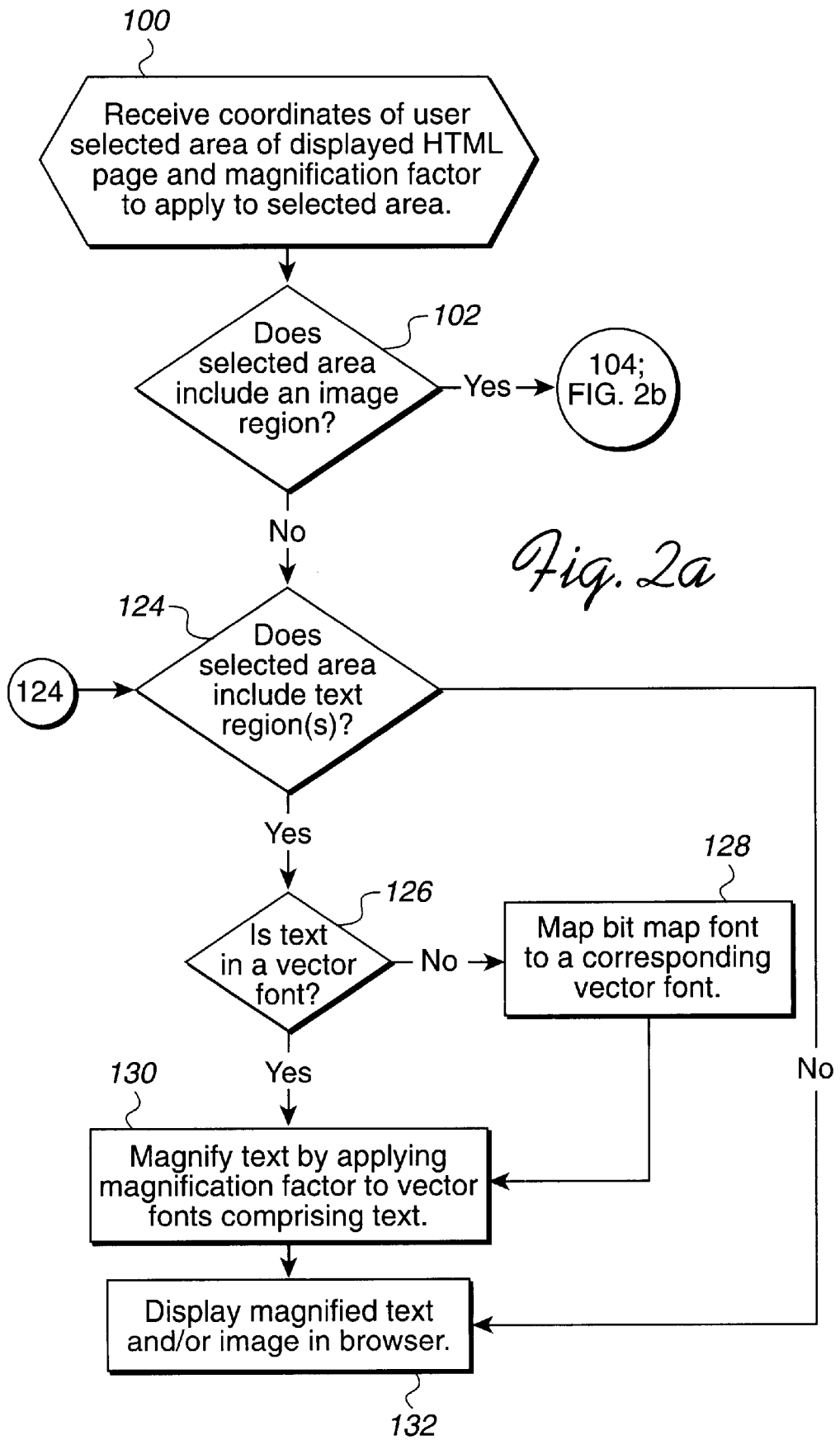

_US 6,700,589 B1_

METHOD, SYSTEM, AND PROGRAM FOR MAGNIFYING CONTENT DOWNLOADED FROM A SERVER OVER A NETWORK

BACKGROUND OF THE INVENTION

1. Field of the Invention

The present invention relates to a method, system, and program for magnifying displayed content downloaded from a server over a network and, in particular, displayed content including images and text.

2. Description of the Related Art

One of the rapidly expanding sources of information and documentation is the "World Wide Web" (WWW) or Internet. Many documents that are available on the Web are images. Images generally are substantially larger files than text files and take longer to download due to the larger file size of images and the limitations of Internet bandwidth. Network delays resulting from overloading network servers or the communication lines are one of the major customer complaints about network access.

One of the most popular image viewing tools is a magnification tool which allows the user to enlarge or reduce the size of the image. However, Internet content providers that provide images that users may want to magnify face a dilemma. If they want to reduce download times, then they must limit the resolution of the image users download as a higher resolution image requires more pixels of information, hence creating larger files. However, the lower the resolution of an image, the poorer the image quality as the image is enlarged using a magnification tool. On the other hand, to improve the quality of magnified images, the Internet content provider would have to increase the resolution of the image and, hence, the file size. Increasing the file size to improve resolution during magnification operations will increase network delays to download the files, reduce network bandwidth and result in consumer dissatisfaction with the lengthy download times associated with the content provider's Web site.

One solution to the above dilemma is for the content provider to perform the magnification operations at the server, and then send the image at the requested magnification to the user computer. For instance, Mapquest.com, Inc. allows users to download a section of a map showing a street address. The user using a "Zoom" tool may select to enlarge or reduce the current view of the street map. When the user changes the magnification level, the server is contacted and the new magnification level is downloaded to the user. Thus, any magnification, i.e., expansion or reduction, of the bit map is performed at the content provider (Mapquest) server. In this way, the content provider need not provide the user the highest resolution image of the map, but may initially provide a lower resolution image to reduce delays in download times. If the user wants to enlarge the view, then Mapquest sends a higher resolution magnified view of a smaller area. This further limits the size of the file as the portion of the image enlarged is less than the portion of the image previously viewed. Thus, the overall file size of the image may not increase because the user is not presented a higher resolution view of the entire previous lower resolution image, but is instead provided a higher resolution view of a smaller area of the previous image.

Although the above approach may help limit the file size of the higher resolution image, there are still drawbacks with the server oriented approach where the user must contact the content provider's site to obtain a new magnified level of the image. First, is that for each change in magnification, the user must contact the service provider's site. This may result in the user experiencing further network delays. Further, performing the zoom operations at the server would increase processing burdens on the server that may overload the server processor, thereby causing delays in responding to Internet document requests that are unrelated to bandwidth issues. Still further, the user may have wanted a magnified view of the entire image area at the high resolution and not a magnified view of a smaller area of the previously viewed image. In such case, the user would have to send further requests to the content provider to obtain an enlarged view of other areas of the previously viewed images not initially returned in response to the magnification request.

Developing techniques for allowing users to better manipulate images is important given that the majority of data being downloaded over the Internet comprises image content and that in many instances users want to enlarge the view of an image. Thus, there is a need in the art to provide an improved method, system, and program for allowing a user to perform magnification operations on images downloaded over the Internet and at the same time minimize network bandwidth usage and processing burdens imposed on the content provider server.

SUMMARY OF THE PREFERRED EMBODIMENTS

To overcome the limitations in the prior art described above, preferred embodiments disclose a system, method, and program for magnifying displayed content downloaded from a server over a network. Information is received indicating a selection of a region of the displayed content to magnify. A determination is made of at least one region of the selected region including image content. The server maintains a high resolution file version and a low resolution file version of the image content. A determination is then made as to whether the selected image content from the displayed image file is the low resolution file version. If so, a command is generated to retrieve from the server specific byte locations from the high resolution file version including the image content in the selected region. The specified bytes are less than all the image data bytes in the high resolution version of the file if the image content in the selected region comprises less than all of the image content maintained in the high resolution version of the file.

In further embodiments, a requested magnification operation is performed on the bytes in the high resolution file version retrieved from the server to magnify image content in the selected region.

In yet further embodiments, a determination is made as to whether the selected region includes both text and image content. If so, a determination is made as to whether the text included in the selected region is in a vector graphics format. If so, a first magnification operation is performed on the bytes from the high resolution file version retrieved from the server to magnify the image content in the selected region. If there are text fonts in the selected region, then a second magnification operation is performed on the fonts in the vector graphic format by manipulating formulas that represent the fonts to magnify the fonts in the selected region.

Still further, if the fonts in the selected region are in a bit map format, a determination is made of a vector font corresponding to the bit map fonts. In such case, the second magnification operation is performed on the corresponding vector font.

Preferred embodiments provide an improved method, system, and program for downloading image content from a server when performing magnification operations on the image content. Preferred embodiments provide a technique that preserves image quality as the server provides a high resolution version of the image when the user or program selects to perform magnification of image content and because the fonts subject to magnification are in vector graphic format. Further, network bandwidth is preserved because only those high resolution bytes including image content that are in the selected region subject to the magnification are requested from the server, no more. Network bandwidth is also preserved because any magnification of text content that is in the selected region is performed locally, and no downloading is required. Moreover, the preferred magnification technique for image and text downloaded from a server over a network reduces processing burdens on the server as the magnification operations are performed locally, not at the server.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
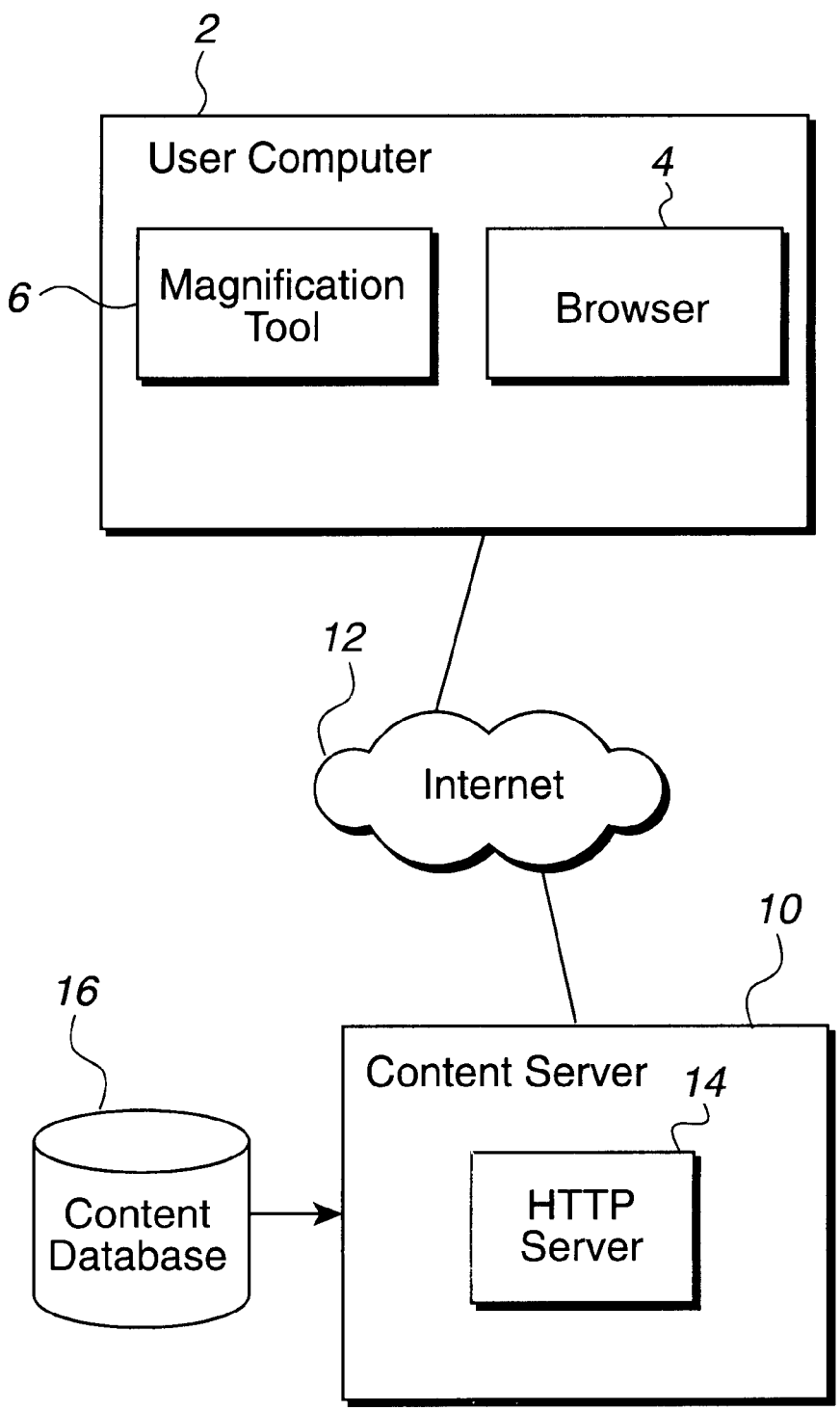
FIG. 1 illustrates a computing environment in which preferred embodiments are implemented.

FIG. 1 illustrates a computing environment in which preferred embodiments are implemented. The computing environment includes a user computer 2, which may comprise any computer device known in the art, such as a desktop computer, laptop computer, workstation, mainframe, server, personal digital assistant (PDA), etc. The computer 2 includes a browser program 4, which may be any program capable of viewing text and images, such as a Hyptertext Mark-up Language (HTML) browser, e.g., Microsoft Internet Explorer, Netscape Communicator, etc.** The computer 2 further includes a magnification tool 6 to enlarge or reduce content displayed in the browser program 4. For instance, the magnification tool 6 could include the capabilities of the Zoom tool included with the Web Accessories for Microsoft Internet Explorer version 5, where the user may enlarge or reduce a image displayed in an HTML page.

**NETSCAPE is a registered trademark of the Netscape Communications Corporation; Microsoft is a registered trademark of the Microsoft Corporation The user computer 2 may communicate with a content server 10 over the Internet 12, or any other network, e.g., a LAN, Intranet, etc. The content server 10 is preferably a server class machine capable of managing numerous data requests from servers. The content server includes an HTTP server program 14 to respond to HTTP requests from browsers 4 in clients. The HTTP server 14 includes the capability to generate HTML pages including text and image content from a content database 16. Images in the content database 16 are maintained in a graphical file format known in the art, such as a bitmap, GIF, JPEG, etc. In preferred embodiments, the content database 16 maintains high resolution image files. The image files may comprise separate images or together may form a larger image, such as sections of a street map. In the case where a larger image is separated into multiple image files, an image index would be provided to associate one image file with a portion of the image.

In preferred embodiments, when receiving a document request including an image component, the content server 10 would return a low resolution version of the image. The content database 16 may maintain a low resolution version of each high resolution image. Alternatively, the content server 10 could generate a low resolution version of a requested high resolution image in the content database 16 when assembling an HTML page in response to an HTTP request from the user computer 2.

In preferred embodiments, the images included in the content database 16 would include specialized header information, along with other bit map header information known in the art, to allow the magnification tool 6 to take specific actions depending on the resolution of the image subject to a magnification operation. A bitmap image typically includes a bitmap file header, info header, table of color values and the bitmap data itself. The pixels of the image are stored by rows, left to right within each row, in a manner known in the art. The rows are stored bottom to top such that the first byte of a unit of pixel data is for the first pixel in the lower-left corner of the image. In preferred embodiments, information may be placed in the file header or info header indicating whether there is a corresponding high resolution image of the current bit map image and the resolution of the high resolution counterpart.

Figure 2B:
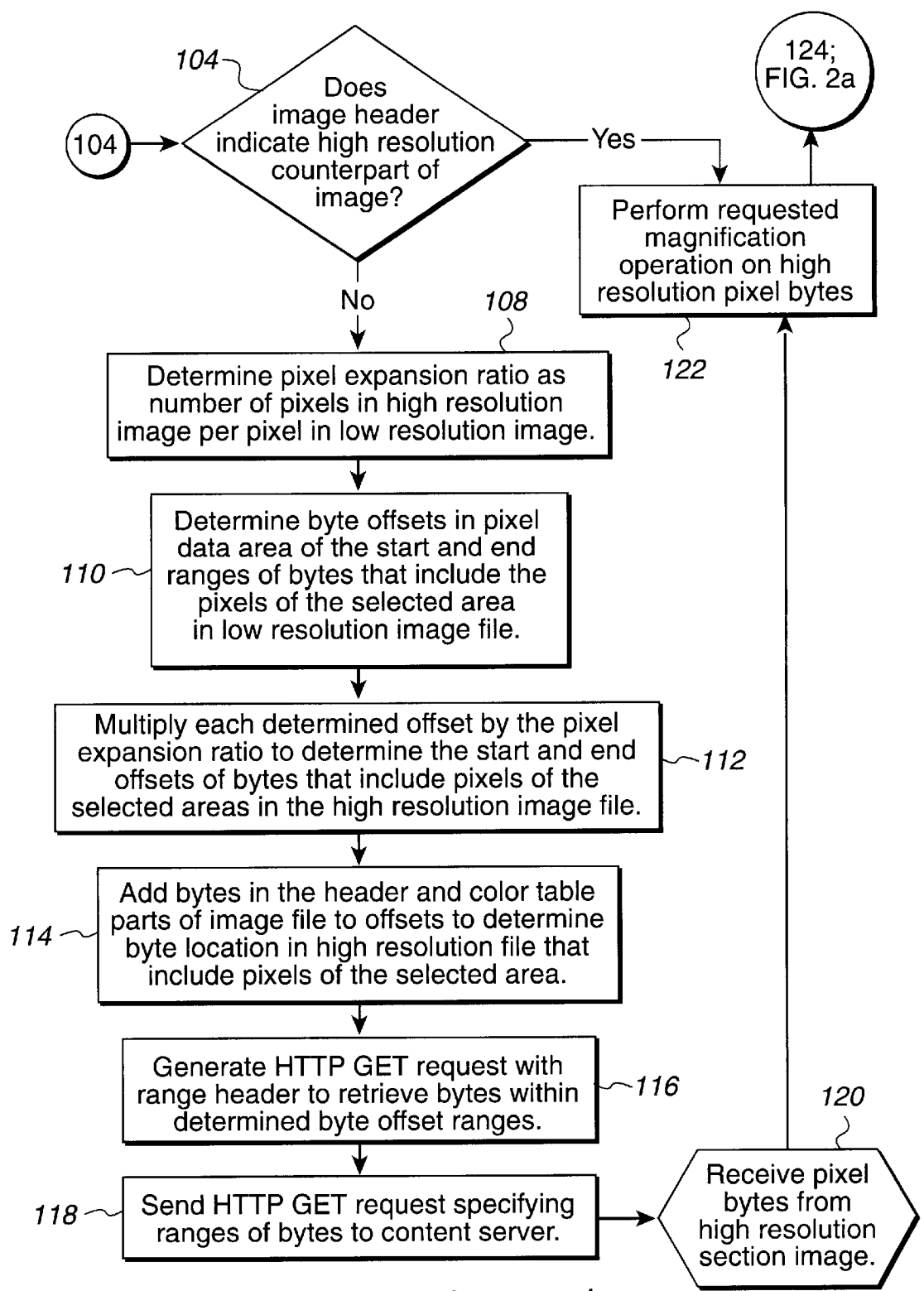
FIGS. 2a, b illustrate logic implemented in a client magnification tool to magnify displayed pages including text and/or image content downloaded over a network.

FIGS. 2a, b illustrates logic implemented in the magnification tool 6 to process user requests to enlarge or reduce an area of an HTML page displayed in the browser 4. In preferred embodiments, the magnification tool 6 is incorporated with the browser 4, such as a browser 4 plug-in, and is capable of controlling browser 4 operations, such as causing the browser 4 to generate an HTTP GET request to retrieve data from the content server 10 and manipulate the display of HTML pages downloaded from the Internet 12. The user computer 2 may download into the browser 4 an HTML page including text and images. The content provider may initially provide the user a low resolution version of an image in the requested HTML page to conserve network bandwidth and minimize download delay times. After downloading the HTML page, the user may then, using an input device such as a mouse pointer, select within the browser 4 a two-dimensional area to subject to magnification. In alternative embodiments, the selection of magnification levels may occur automatically using predetermined magnification levels without requiring human interaction, such as during a self-running demo program. As used herein "magnification" refers to either enlargement or reduction of the content in a display region. The user's invocation of the magnification tool 6 would initiate the operation at block 100 in FIG. 2A, where the magnification tool 6 receives coordinates of the user selection of an (x, y) area of the displayed HTML page and a user selected magnification operation to magnify the selected area according to a magnification factor.

The magnification tool 6 determines whether the user selected area of the displayed page includes image content. If so, then control proceeds to block 104 in FIG. 2b, where the magnification tool 6 will read a predesignated area of the header fields of the image file including the selected image content to determine whether there is a high resolution counterpart to the displayed image. As discussed, in preferred embodiments, information is included in the image header fields to indicate whether there is a high resolution counterpart to the displayed image at the content server 10, including URL location information and the actual high resolution.

If there is a high resolution version of the image, then at steps 108–114, the magnification tool 6 performs operations to determine the offsets into the pixel data area of the high resolution image of ranges of pixels that correspond to the user selected pixels in the low resolution image. Thus, for the pixels that form the user selected area of the low resolution image, the magnification tool 6 determines the corresponding pixels in the high resolution image that form the user selected area of the image. At block 108, the magnification tool 6 determines a pixel expansion ratio as the ratio of the number of pixels in the high resolution image to the number of pixels in the current displayed low resolution image. The magnification tool 6 then determines (at block 110) the byte offsets of the start and end of ranges of bytes that include the pixels of the user selected area in the low resolution image file. Each determined offset is then multiplied (at block 112) by the pixel expansion ratio to determine the start and end offsets of byte locations in the high resolution image file corresponding to the pixels in the user selected area of the low resolution image.

The pixel data area of both the high and low resolution images would include the same number of bytes for the bit map file header, information, and color table fields. For this reason, the magnification tool 6 adds (at block 114) the byte length of these header fields to each determined offset byte in the pixel data area of the high resolution image to determine the byte offset of the start and end of each range of pixels in the selected image area from the beginning of the high resolution image file. The magnification tool 6 then generates an HTTP GET request to retrieve each range of bytes in the high resolution file including the user selected image area. The HTTP protocol allows a GET request to specify byte ranges of a file to download instead of the whole file. The magnification tool 6 may also cause the downloading of the header portions of the high resolution image to maintain information on those high resolution portions. Details of specifying a range header in the HTTP GET request are described in the Request for Comments 2068 entitled "Hypertext Transfer Protocol—HTTP/1.1" (January 1997). The magnification tool 6 then has the browser 4 send the generated GET request including the specified byte ranges to the content server 10.

After receiving (at block 120) the requested bytes of pixels from the high resolution image, the magnification tool 6 performs (at block 122) the requested magnification on the high resolution pixel bytes to magnify the image portion of the user selected area using magnification techniques known in the art.

If at block 104 the selected image area is already at the high resolution, i.e., there is no high resolution counterpart in the content server 10, then control proceeds to block 122 to perform the requested magnification operation using the magnification factor and magnification techniques known in the art.

After performing the magnification on the image portion of the user selected area of the HTML page or after determining that there is no image portion included in the user selected area, then control transfers to block 124 in FIG. 2a determines whether the selected area of the HTML page includes text. If so, then the magnification tool 6 determines whether the text in the selected area is in a vector font format. A vector font comprises a geometrical/mathematical definition and thus can be readily scaled without affecting the quality of the font. A bit map font is a font that is defined by a bit mapped representation of the font. Because a bit map font comprises a bit map of dots that forms the font, the quality of the bit map font would suffer if the bit map font is enlarged. For this reason, if the text comprises a bit map font, the magnification tool 6 maps (at block 128) the bit map font to a corresponding vector font, which can be scaled without reducing image quality. After the text is in a vector font format, the magnification tool 6 magnifies (at block 130) the vector fonts in the text by the magnification factor to magnify the text.

After all the text and image in the user selected area of the HTML page is magnified at blocks 122 and 130, control proceeds to block 132 to display the magnified text and/or image in the browser 4 display area.

The preferred embodiment technique for magnifying a displayed region of a viewer, such as a browser, that downloads images from over a network such as the Internet minimizes download times by providing the user the minimal amount of data needed to magnify data in a manner that does not degrade the quality of the magnified image. The initial image presented, which is all the user may need, is in a low resolution format, thereby minimizing download times. If the user wants to magnify a portion of that low resolution image, then the preferred embodiment magnification tool will request the high resolution version of only those bytes of the selected magnification area. The user may then perform the magnification locally on the downloaded high resolution portion of the image. This differs from prior art techniques that overburden the content server by having the content server perform the magnification operations. Further, network bandwidth is conserved because only those high resolution bytes that are subject to the magnification are downloaded, not the image content in the entire displayed region.

Still further, with preferred embodiments, different magnification operations are performed with respect to text to allow all magnification operations with respect to text to be performed locally. Yet further, text magnification operations preserve the image quality of the text by converting any bit map or scalar fonts to vector fonts before performing the magnification. This technique of performing separate magnification operations on text and images further conserves network bandwidth because any text portions of the selected area to magnify are not requested from the remote content server.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments were described with respect to presenting information in pages conforming to the HTML file format. However, the browser may be capable of displaying pages in formats other than HTML, such as a browser or viewer that is capable of displaying documents in a word processing format, graphic files or any other document format known in the art. In this way, the preferred embodiment magnification tool may be implemented with any document editing or viewing program that downloads documents from the Internet. In preferred embodiments, the browser or viewer with which the magnification tool interfaces is capable of downloading pages from a remote server.

In preferred embodiments, the magnification tool in which preferred embodiments are implemented is described as separate from the browser program. In alternative embodiments, the functionality of the preferred embodiment magnification tool may be incorporated into the browser program code.

In preferred embodiments, the user computer and content server communicate over the Internet. However, in alternative embodiments, the user and content server may be located within a local network, such as a LAN or Intranet.

In preferred embodiments, the user computer requested documents using the HTTP protocol. In alternative embodiment, different communication protocols may be used to allow the user computer to request byte ranges from a document or image.

In preferred embodiments, the magnification tool converts bitmap fonts to vector fonts before performing the magnification operations. In alternative embodiments, to magnify text components of combined text and image, the magnification tool may perform a bit map expansion of the bit map fonts.

In preferred embodiments, the existence of a high resolution version of an image file of a displayed image is determined by examining information in the header fields of the displayed image. In alternative embodiments, the existence of a high resolution version of an image file may be determined by querying the content server 14 for any high resolution versions of the image file including image content in the user selected area, without examining header information in the image file. This alternative embodiment does not require any specialized modifications to the header information in the bit map file, but does require further network communication, which may result in network delays to the requested operation.

In summary, the present invention provides a system, method, and program for magnifying displayed content downloaded from a server over a network. Information is received indicating a selection of a region of the displayed content to magnify. A determination is made of at least one region of the selected region including image content. The server maintains a high resolution file version and a low resolution file version of the image content. A determination is then made as to whether the selected image content from the displayed image file is the low resolution file version. If so, a command is generated to retrieve from the server specific byte locations from the high resolution file version including the image content in the selected region. The specified bytes are less than all the image data bytes in the high resolution version of the file if the image content in the selected region comprises less than all of the image content maintained in the high resolution version of the file.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for magnifying displayed content downloaded from a server over a network, comprising:

receiving selection of a region of the displayed content to magnify;

determining at least one region of the selected region including image content, wherein the server maintains a high resolution file version and a low resolution file version of the image content;

determining whether the selected image content from the displayed image file is the low or high resolution file version;

if the selected image is determined to be the low resolution version of the file, then generating a command to retrieve from the server specific byte locations from the high resolution file version including the image content in the selected region, wherein the specified bytes are less than all the image data bytes in the high resolution version of the file if the image content in the selected region comprises less than all of the image content maintained in the high resolution version of the file; and if the selected image is determined to be the high resolution version of the file, then performing a specified magnification operation on the bytes in the high resolution file version retrieved from the server to magnify image content in the selected region.

2. The method of claim 1, wherein the selected region and specified magnification operation are provided from a user input device receiving user entered information.

3. The method of claim 1, wherein the selected region and specified magnification operation are provided from predetermined data in an executing program.

4. The method of claim 1, further comprising:

determining whether the selected region includes both text and image content;

determining whether the text included in the selected region is in a vector graphics format;

performing a first magnification operation on the bytes from the high resolution file version retrieved from the server to magnify the image content in the selected region; and performing a second magnification operation on the fonts in the vector graphic format by manipulating formulas that represent the fonts to magnify the fonts in the selected region.

5. The method of claim 4, further comprising determining a vector font corresponding to the fonts in the selected region area that are in a bit map format, wherein the second magnification operation is performed on the corresponding vector font for those fonts in the selected region that are in the bit map format.

6. The method of claim 1, wherein determining whether the selected image content from the displayed image file is in the low resolution file version further comprises determining whether header information in the displayed image file indicates that there is a high resolution file version for the displayed image file.

7. The method of claim 1, wherein determining whether the selected image content from the displayed image file is in the low resolution version further comprises querying the server for a high resolution version of the image file.

8. The method of claim 1, wherein the network is the Internet.

9. The method of claim 1, wherein the command to retrieve specific byte location specifies ranges of bytes within the high resolution version of the file to download from the server.

10. The method of claim 9, wherein the command to retrieve byte locations comprises an HTTP GET request including ranges of bytes from the requested high resolution version of the file to download.

11. A system for magnifying displayed content downloaded from a server over a network, comprising:
  means for receiving selection of a region of the displayed content to magnify;
  means for determining at least one region of the selected region including image content, wherein the server maintains a high resolution file version and a low resolution file version of the image content;
  means for determining whether the selected image content from the displayed image file is the low or high resolution file version;
  means for generating, if the selected image is determined to be the low resolution version of the file, a command to retrieve from the server specific byte locations from the high resolution file version including the image content in the selected region, wherein the specified bytes are less than all the image data bytes in the high resolution version of the file if the image content in the selected region comprises less than all of the image content maintained in the high resolution version of the file; and
  means for performing, if the selected image is determined to be the high resolution version of the file, a specified magnification operation on the bytes in the high resolution file version retrieved from the server to magnify image content in the selected region.

12. The system of claim 11, wherein the selected region and specified magnification operation are provided from a user input device receiving user entered information.

13. The system of claim 11, wherein the selected region and specified magnification operation are provided from predetermined data in an executing program.

14. The system of claim 11, further comprising:
  means for determining whether the selected region includes both text and image content;
  means for determining whether the text included in the selected region is in a vector graphics format;
  means for performing a first magnification operation on the bytes from the high resolution file version retrieved from the server to magnify the image content in the selected region; and
  means for performing a second magnification operation on the fonts in the vector graphic format by manipulating formulas that represent the fonts to magnify the fonts in the selected region.

15. The system of claim 14, further comprising means for determining a vector font corresponding to the fonts in the selected region area that are in a bit map format, wherein the means for the second magnification operation is performed on the corresponding vector font for those fonts in the selected region that are in the bit map format.

16. The system of claim 11, wherein the means for determining whether the selected image content from the displayed image file is in the low resolution file version further comprises means for determining whether header information in the displayed image file indicates that there is a high resolution file version for the displayed image file.

17. The system of claim 11, wherein the means for determining whether the selected image content from the displayed image file is in the low resolution version further comprises querying the server for a high resolution version of the image file.

18. The system of claim 11, wherein the network is the Internet.

19. The system of claim 11, wherein the command to retrieve specific byte location specifies ranges of bytes within the high resolution version of the file to download from the server.

20. The system of claim 19, wherein the command to retrieve byte locations comprises an HTTP GET request including ranges of bytes from the requested high resolution version of the file to download.

21. An article of manufacture for use for magnifying displayed content downloaded from a server over a network, the article of manufacture comprising at least one computer program capable of causing a computer to perform:
  receiving selection of a region of the displayed content to magnify;
  determining at least one region of the selected region including image content, wherein the server maintains a high resolution file version and a low resolution file version of the image content;
  determining whether the selected image content from the displayed image file is the low or high resolution file version;
  if the selected image is determined to be the low resolution version of the file, then generating a command to retrieve from the server specific byte locations from the high resolution file version including the image content in the selected region, wherein the specified bytes are less than all the image data bytes in the high resolution version of the file if the image content in the selected region comprises less than all of the image content maintained in the high resolution version of the file; and
  if the selected image is determined to be the high resolution version of the file, then performing a specified magnification operation on the bytes in the high resolution file version retrieved from the server to magnify image content in the selected region.

22. The article of manufacture of claim 21, wherein the selected region and specified magnification operation are provided from a user input device receiving user entered information.

23. The article of manufacture of claim 21, wherein the selected region and specified magnification operation are provided from predetermined data in an executing program.

24. The article of manufacture of claim 21, further comprising:
  determining whether the selected region includes both text and image content;
  determining whether the text included in the selected region is in a vector graphics format;

performing a first magnification operation on the bytes from the high resolution file version retrieved from the server to magnify the image content in the selected region; and performing a second magnification operation on the fonts in the vector graphic format by manipulating formulas that represent the fonts to magnify the fonts in the selected region.

25. The article of manufacture of claim 24, further comprising determining a vector font corresponding to the fonts in the selected region area that are in a bit map format, wherein the second magnification operation is performed on the corresponding vector font for those fonts in the selected region that are in the bit map format.

26. The article of manufacture of claim 21, wherein determining whether the selected image content from the displayed image file is in the low resolution file version further comprises determining whether header information in the displayed image file indicates that there is a high resolution file version for the displayed image file.

27. The article of manufacture of claim 21, wherein determining whether the selected image content from the displayed image file is in the low resolution version further comprises querying the server for a high resolution version of the image file.

28. The article of manufacture of claim 21, wherein the network is the Internet.

29. The article of manufacture of claim 21, wherein the command to retrieve specific byte location specifies ranges of bytes within the high resolution version of the file to download from the server.

30. The article of manufacture of claim 29, wherein the command to retrieve byte locations comprises an HTTP GET request including ranges of bytes from the requested high resolution version of the file to download.

* * * * *